United States Patent Office 2,892,837
Patented June 30, 1959

2,892,837

PREPARATION OF 2-METHYL-4,5,6,7-TETRAHYDROBENZOXAZOLE AND CYANINE DYES THEREFROM

George de Stevens, Portland, and Robert H. Sprague, East Hampton, Conn., assignors to Sperry Rand Corporation, New York, N.Y., a corporation of Delaware No Drawing. Application August 22, 1955
Serial No. 529,963

11 Claims. (Cl. 260—240.4)

This invention relates to cyanine dyes containing a 4,5,6,7-tetrahydrobenzoxazole nucleus and to process for preparing such dyes.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

We have now found that it is possible to prepare cyanine dyes in which one or both of the above mentioned auxochromic nitrogen atoms lie in a 4,5,6,7-tetrahydrobenzoxazole nucleus. We have further found that these new cyanine dyes sensitize photographic emulsions strongly and cleanly, i.e. without producing excessive fog or residual dye stain.

It is accordingly an object of our invention to provide new cyanine dyes. A further object is to provide photographic emulsions sensitized with such dyes. Other objects will appear hereinafter.

As starting material for the preparation of our new dyes we employ 2-alkyl-4,5,6,7-tetrahydrobenzoxazole, particularly 2-methyl-4,5,6,7-tetrahydrobenzoxazole. We first convert these alkyl-4,5,6,7-tetrahydrobenzoxazoles to quaternary salts by reacting the base with esters, such as alkyl halides, alkyl sulfates, or alkyl-p-toluene sulfonates, for example. For purposes of convenience the quaternary salts useful in practicing this invention can be represented by the following single formula:

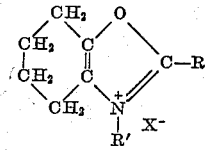

wherein R' represents an alkyl group, e.g. methyl, ethyl, n-propyl, isobutyl, n-butyl, β-hydroxyethyl, β-methoxyethyl, β-ethoxyethyl, β-acetoxyethyl, β-carboxyethyl, carboxymethyl, β-carbomethoxyethyl, β-carbethoxyethyl, allyl, etc. or an aralkyl group, e.g. benzyl, phenyl, ethyl, etc., R represents methyl, ethyl or n-propyl and X⁻ represents an anion, e.g. chloride, bromide, iodide, benzene sulfonate, p-toluene sulfonate, methyl sulfate, ethyl sulfate, thiocyanate, perchlorate, acetate, etc.

To prepare pseudocyanine dyes from such quaternary salts, we react the quaternary salts with 2-halogenoquinoline quaternary salts, in the presence of an acid binding agent, such for example, as sodium ethylate, sodium carbonate, pyridine or a strong organic base (e.g. triethyl amine, tri-methylamine and N-methyl piperidine). We have found it advantageous to employ a mixture of pyridine with a strong tertiary organic base.

Instead of 2-halogenoquinoline quaternary salts we can employ 2-alkyl mercapto or 2-aryl mercaptoquinoline quaternary salts to condense with the quaternary salts of 2-alkyl-4,5,6,7-tetrahydrobenzoxazole, in the presence of an acid binding agent.

Using 2-halogenopyridine quaternary salts instead of 2-halogenoquinoline quaternary salts we can prepare pyrido-cyanine dyes containing a 4,5,6,7-tetrahydrobenzoxazole nucleus.

Using 2-alkyl mercapto or 2-aryl mercaptobenzothiazole or naphthothiazole salts we can prepare simple cyanine dyes other than pseudocyanine dyes.

To prepare unsymmetrical carbocyanine dyes from 2-alkyl-4,5,6,7-tetrahydrobenzoxazole quaternary salts we react the quaternary salts with cycloammonium quaternary salts containing a β-aryl aminovinyl group in the alpha or gamma position, i.e. in one of the so-called reactive positions in the presence of an acid binding agent, e.g. pyridine or pyridine plus triethyl amine.

To prepare styryl dyes from our new quaternary salts we condense them with p-dialkyl aminobenzaldehyde in the presence of an alkaline catalyst, e.g. piperidine in absolute ethanol solution.

To prepare merocarbocyanine dyes from 2-alkyl-4,5,6,7-tetrahydrobenzoxazole quaternary salts we condense the quaternary salts with ketomethylene heterocyclic intermediates containing an aryl amino-methylene group in the 5-position in the presence of an acid binding agent, e.g. pyridine plus triethyl amine. Examples of such ketomethylene intermediates are 5-acetanilido methylene-3-ethyl rhodanine, 5-acetanilidomethylene-1-phenyl-2-thiohydantoin, etc.

To sensitize photographic silver halide emulsions with our new dyes, we disperse the dyes in the emulsions. Our invention is particularly directed to the customarily employed gelatino-silver-halide emulsions, such as the gelatino-silver-bromide, bromiodide, chloride and chlorobromide for example. The methods of incorporating dyes in emulsions are simple and well known to those skilled in the art and described in various patents and publications for example, U.S. Patent 2,336,843, patented December 14, 1943.

The preparation of 2-methyl-4,5,6,7-tetrahydrobenzoxazole (I) and cyanine dyes therefrom is the subject of this invention.

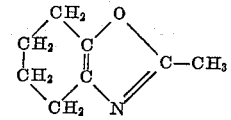

McCoy and Day (J.A.C.S. 65, 2159 (1943)) suggest the synthesis of simple oxazoles by reacting an alpha amino ketone with acetic anhydride.

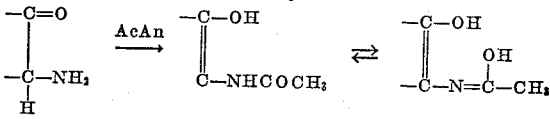

The application of this method in the case of α-amino cyclohexanone has led to the first successful synthesis of a saturated ring system fused to an oxazole ring.

We first prepared alpha amino cyclohexanone by treating chlorocyclohexanone with dry ammonia gas. The reaction mixture was reacted with acetic anhydride. The yield of 2-methyl-4,5,6,7-tetrahydrobenzoxazole was low. However, when the method of Baumgarten and Bower (J.A.C.S. 76, 456 (1954)) for the synthesis of α-amino cyclohexanone was employed, excellent yields of the desired heterocyclic base were obtained.

The following examples will serve to demonstrate the manner of preparation of our new base, quaternary salts and dyes. These examples are not intended, however, to limit our invention.

*Example I.—2-methyl-4,5,6,7-tetrahydrobenzoxazole*

Method A.—100 g. (0.76 mole) of α-chlorocyclohexanone dissolved in 150 cc. of ether was treated with ammonia gas at room temperature for 3 hours. A copious white precipitate separated out of the ether solution. This crystalline material (M.P. 60°–65°) was collected on a filter.

Addition of water to the white crystals resulted in the separation of an oil below the water. This heterogenous mixture was neutralized with hydrochloric acid to pH 7.5, and then extracted with ether. This ether extract was combined with the original ether filtrate and dried over $K_2CO_3$.

After removal of the ether, the oily residue was treated with 150 g. of acetic anhydride and refluxed for 30 minutes. The acetic anhydride was distilled off at atmospheric pressure and the residue was distilled at reduced pressure, the fraction coming over at 94°–97°/20 mm. being obtained in 8% yield.

Method B.—To 62.0 g. (0.415 mole) α-amino cyclohexanone hydrochloride prepared according to the method of Baumgarten and Bowers, were added 23 g. (0.25 mole+10% excess) of sodium acetate and 350 cc. of acetic anhydride. The mixture was refluxed for 90 minutes. After removal of the acetic anhydride at atmospheric pressure, the residue was distilled through a Vigreux column at reduced pressure. The 2-methyl-4,5,6,7-tetrahydrobenzoxazole distilled over at 88°–90°/16 mm. The yield was 60% of theoretical.

*Example II.—2-methyl-4,5,6,7-tetrahydrobenzoxazole etho-p-toluene sulfonate*

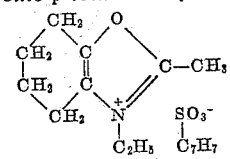

A mixture of 5 g. (1 mol.) 2-methyl-4,5,6,7-tetrahydrobenzoxazole and 6.2 g. (1 mol.+10% excess) of ethyl p-toluene sulfonate was heated on an oil bath at 140° for 5 hours. A brown viscous material was obtained which, after washing well with ether, was used directly for the preparation of dyes.

*Example III.—2-methyl-4,5,6,7-tetrahydrobenzoxazole ethiodide*

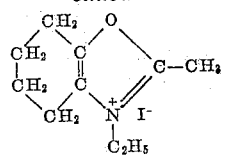

13.7 g. (0.1 mole) of 2-methyl-4,5,6,7-tetrahydrobenzoxazole and 17.0 g. (0.1 mole+20% excess) of ethyl iodide were allowed to stand at room temperature for 56 hours. Some quaternary salt separated out as a yellow oil. The mixture was then refluxed for 45 minutes, after which time quaternarization appeared to be complete. No crystalline material could be obtained. Thus, the viscous material was used as such for the preparation of dyes.

*Example IV.—3,3'-diethyl-4',5',6',7'-tetrahydrooxacarbocyanine iodide*

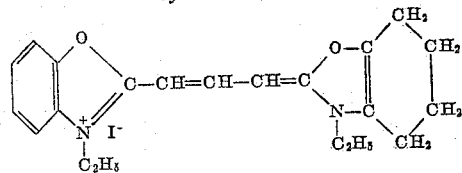

3.37 g. (0.01 mole) of 2-methyl-4,5,6,7-tetrahydrobenzoxazole etho-p-toluene sulfonate and 4.18 g. (0.01 mole) of 2-β-acetanilido-vinyl benzoxazole ethiodide were dissolved in boiling absolute ethyl alcohol. To this solution was added 2 g. (0.02 mole) of triethylamine and refluxing was continued for 7 minutes. After chilling overnight, the dye crystals were collected on a filter, washed well with water, then acetone and air dried. The yield of crude dye was 30% of theoretical. After two recrystallizations from methanol (50 cc. gram) the pure dye was obtained as tiny red crystals in 10% yield M.P. 278°–279° d. A methanol solution of the dye exhibited a yellow color and had an absorption maximum at 474 mu.

*Example V.—1',3-diethyl-4,5,6,7-tetrahydro oxa-2'-cyanine iodide*

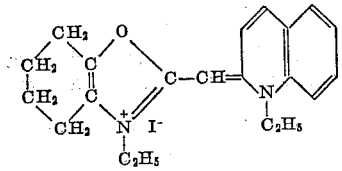

1.7 g. (0.005 mole) of 2-methyl-4,5,6,7-tetrahydrobenzoxazole etho-p-toluene sulfonate, 2.0 g. (0.005 mole) of 2-iodoquinoline ethiodide, 20 cc. of absolute ethyl alcohol and 1 g. (0.01 mole) of triethyl-amine were refluxed for 15 minutes. On chilling, a precipitate was obtained which was collected on a filter, washed well with water, then acetone and air dried. The yield of crude dye was 0.6 g., 27% of theoretical. After two recrystallizations from methanol (50 cc. per gram), the pure dye was obtained as bright orange needles in 22% yield, M.P. 297° d. A methanol solution of the dye was yellow in color and had an absorption maximum at 446 mu.

*Example VI.—3-ethyl-5-[(3-ethyl-4,5,6,7-tetrahydro (2,3) benzoxazolylidene)ethylidene]rhodanine*

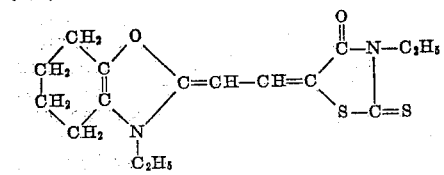

2.98 g. (0.01 mole) of 2-methyl-4,5,6,7-tetrahydrobenzoxazole ethiodide, 3.0 g. (0.01 mole) of 5-acetanilido-methylene-3-ethyl rhodanine, 20 cc. of pyridine and 1.0 g. (0.01 mole) of triethylamine were refluxed for 40 minutes. After chilling overnight, 400 cc. of ether was added to the solution and chilled again. The ether was decanted and the residue was washed well with fresh portions of ether, and then with water. The resulting crystalline residue was recrystallized twice from methanol (300 cc./gram) to give a 45% yield of pure dye as bright red needles, M.P. 198°–200° d. A methanol solution of the dye had an orange red color and had an absorption maximum at 510 mu.

*Analysis.*—Calcd. for $C_{15}H_{20}N_2O_2S_2$: C, 57.10; H, 5.99; N, 8.33; S, 19.06. Found: C, 57.25; H, 5.77; N, 8.16; S, 19.26.

*Example VII.—3,3'-diethyl-4'methyl-4,5,6,7-tetrahydrooxathiazolocarbocyanine iodide*

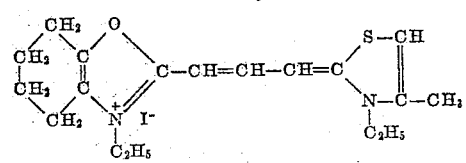

2.98 g. (0.01 mole) of 2-methyl-4,5,6,7-tetrahydrobenzoxazole ethiodide, 3.95 g. (0.01 mole) of 2-β-acetanilidovinyl-4-methyl thiazole ethiodide, 25 cc. of absolute ethyl alcohol and 1.0 g. (0.01 mole) of triethyl amine were refluxed for 25 minutes. After chilling overnight, the precipitate was collected at the pump, washed well with water, then acetone and air dried. The yield of crude dye was 57% of theoretical. After three recrystallizations from methanol (20 cc. per gram) the yield of pure dye, melting at 244°-246° with decomposition, was 35%. Mixed melting point of this dye, the tetrahydrobenzoxazole moiety of which was prepared by method B, with the dye prepared from the tetrahydrobenzoxazole moiety prepared by method A, showed no depression. The dye was in the form of blue crystals with a silvery reflex. Their identity was further exemplified in their absorption maxima at 518 mu.

*Example VIII.—3,3'-diethyl-9'-methyl-4,5,6,7-tetrahydrooxathiazolocarbocyanine iodide*

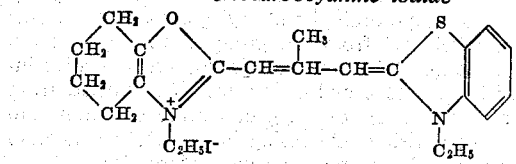

2.98 g. (0.01 mole) of 2-methyl-4,5,6,7-tetrahydrobenzoxazole ethiodide, 4.00 g. (0.01 mole) of 2(2-methyl mercaptopropenyl) benzothiazole etho-p-toluene sulfonate, 20 cc. of pyridine, and 1.00 g. (0.01 mole) of triethyl amine were refluxed 20 minutes. After chilling, the dye was precipitated by the addition of 400 cc. of ether. The ether was decanted and the viscous residue was washed well with fresh portions of ether, then water, and finally triturated with 5 cc. of acetone. The crystalline dye was collected on a filter, washer with acetone, and air dried. Two recrystallizations from methanol (100 cc. per gram) gave a 10% yield of pure dye as red needles, M.P. 254°-256° d. A methanol solution of the dye had an absorption maximum at 506 mu.

*Example IX.—2-p-dimethylaminostyryl-4,5,6,7-tetrahydrobenzoxazole ethiodide*

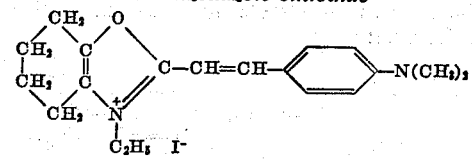

2.98 g. (0.01 mole) of 2-methyl 4,5,6,7-tetrahydrobenzoxazole ethiodide, 1.50 g. (0.01 mole) of p-dimethyl aminobenzaldehyde, 15 cc. of absolute ethyl alcohol and 3 drops of piperidine were refluxed for 45 minutes. After chilling overnight, the dye crystals were collected on a filter, washed well with water, then acetone and air dried. Two recrystallizations from methanol (30 cc. per gram) gave a 10% yield of pure dye as bright orange needles, melting at 270°-272° with decomposition. A methanol solution of the dye was yellow in color and had an absorption maximum at 452 mu.

It is well known that cyanine dyes resonate between two extreme forms and that a cyanine dye can be represented by either of the two extreme forms. Thus, the unsymmetrical type of instant dyes can be represented by either of the following formulas:

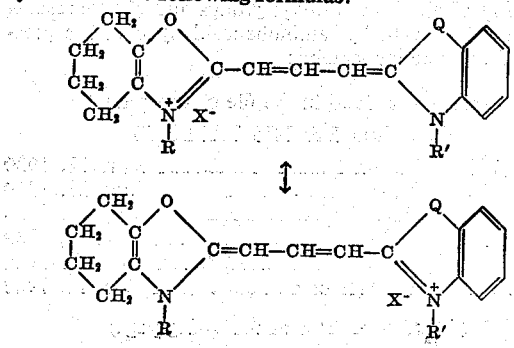

The features of novelty which we believe to be characteristic of our invention are set forth with particularity in the following claims. It should be understood, however, that modifications and changes may be made, without departing from the spirit and substance of our invention, as will be apparent to those skilled in the art.

What we claim as our invention and desire to be secured by Letters Patent of the United States is:

1. A dye selected from the group characterized by the following general formula:

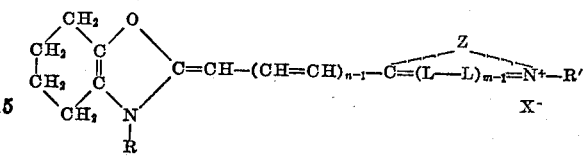

where R and R' respectively represent members selected from the group consisting of alkyl and aralkyl groups, $m$ represents a positive integer from 1 to 2, $n$ represents a positive integer from 1 to 3, L represents a methine group, X represents an acid radical and Z represents the non-metallic atoms necessary to complete a heterocyclic nucleus containing from 5 to 6 atoms in the heterocyclic ring selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series.

2. 3,3' - diethyl - 4',5',6',7' - tetrahydrooxacarbocyanine iodide having the structure:

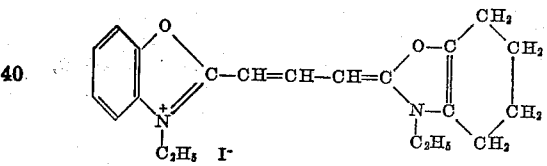

3. 1',3 - diethyl - 4,5,6,7 - tetrahydrooxa - 2' - cyanine iodide having the structure:

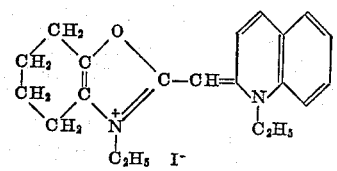

4. 3,3' - diethyl - 9 - methyl - 4,5,6,7 - tetrahydrooxathiacarbocyanine iodide having the structure:

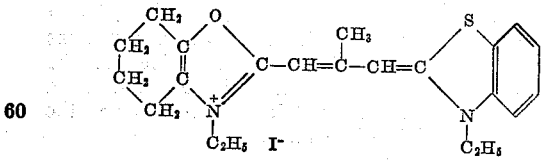

5. A dye selected from the group characterized by the following general formula:

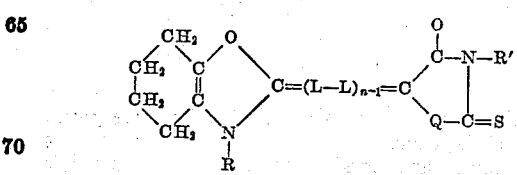

where R is a member selected from the group consisting of alkyl and aralkyl groups, R' is a member selected from the group consisting of alkyl, aralkyl, and aryl groups, L is a methine group, $n$ is a positive integer of from 1 to 4 and Q is a member selected from the group consisting of oxygen, sulfur, selenium and = N–R'.

6. 3 - ethyl - 5 - [3 - ethyl - 4,5,6,7 - tetrahydro(2,3 benzoxazolylidene)ethylidene]rhodanine having the structure:

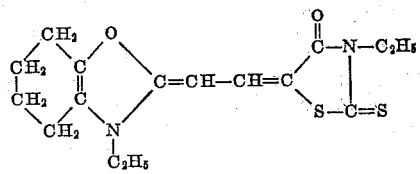

7. A dye selected from the group characterized by the following general formula:

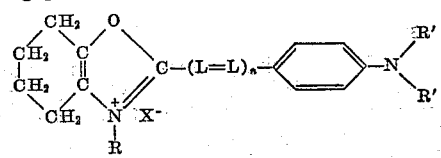

where R and R' represent a member selected from the group consisting of alkyl and aralkyl groups, L represents a methine group, n is a positive integer from one to two, and X⁻ represents an acid radical.

8. 2 - p - dimethyl aminostyryl - 4,5,6,7 - tetrahydrobenzoxazole ethiodide having the following structure:

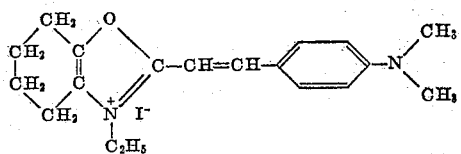

9. A process for preparing unsymmetrical cyanine dyes having the general formula:

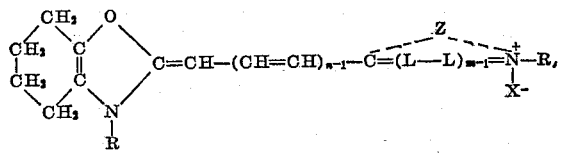

where R and R' respectively represent members selected from the group consisting of alkyl and aralkyl groups, m represents a positive integer from 1 to 2, n represents a positive integer from 1 to 3, L represents a methine group, X⁻ represents an acid radical and Z represents the non-metallic atoms necessary to complete a heterocyclic nucleus containing from 5 to 6 atoms in the heterocyclic ring, selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series from the quaternary salt having the general formula:

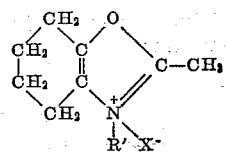

wherein R' represents a member selected from the group consisting of alkyl and aralkyl groups and X⁻ represents an anion comprising condensing said quaternary salt with a heterocyclic ammonium quaternary salt having a reactive constituent selected from the group consisting of aryl amino-vinyl groups, aryl aminobutadienyl groups, halogen atoms and thioether groups in a position selected from the alpha and gamma positions with respect to the nitrogen atom in said heterocyclic ring of said heterocyclic ammonium quaternary salt, in the presence of an alkaline condensing agent.

10. A process for preparing merocarbocyanine dyes containing the 4,5,6,7-tetrahydrobenzoxazole nucleus and having the general formula:

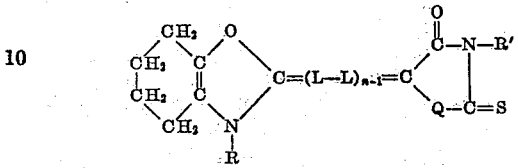

wherein R' represents a member selected from the group consisting of alkyl, aralkyl and aryl groups, R represents a member selected from the group consisting of alkyl and aryl groups, L is a methine group, n is a positive integer of from 1 to 4 and Q is a member selected from the group consisting of oxygen, sulfur, selenium and =N—R' comprising condensing in an alkaline medium a quaternary salt having the general formula:

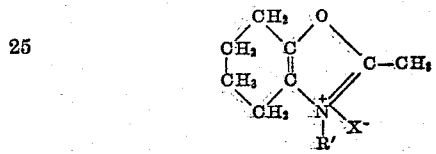

R' represents a member selected from the group consisting of arkyl and aralkyl groups and X⁻ represents an anion with a ketomethylene heterocyclic compound having the ketomethylene heterocyclic ring of said merocarbocyanine dyes and having a reactive arylaminomethylene group in the 5 position with respect to the member represented by Q in the general formula for said merocarbocyanine dye in an alkaline medium.

11. A process for preparing styryl dyes containing the 4,5,6,7-tetrahydrobenzoxazole nucleus and having the general formula:

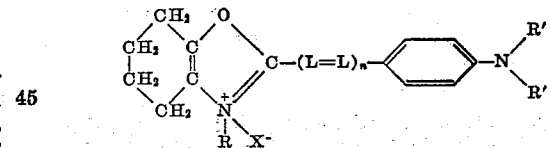

where R and R' respectively represent a member selected from the group consisting of alkyl and aralkyl groups, L represents a methine group, n represents a positive integer from 1 to 2 and X⁻ represents an acid radical comprising condensing a quaternary salt having the formula:

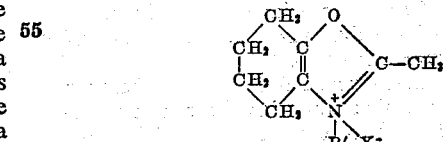

where R' represents a member selected from the group consisting of alkyl and aralkyl groups and X⁻ represents an anion with p-dialkyl aminobenzaldehyde in the presence of an alkaline catalyst.

References Cited in the file of this patent

UNITED STATES PATENTS

| | | |
|---|---|---|
| 2,153,931 | Barent | Apr. 11, 1939 |
| 2,159,565 | Nees | May 23, 1939 |
| 2,166,938 | Carroll | July 25, 1939 |
| 2,179,990 | Beilenson | Nov. 14, 1939 |
| 2,260,256 | Lippincott | Oct. 21, 1941 |
| 2,336,463 | Brooker et al. | Dec. 14, 1943 |

(Other references on following page)

UNITED STATES PATENTS

| | | |
|---|---|---|
| 2,336,843 | Brooker et al. | Dec. 14, 1943 |
| 2,385,281 | Huppert | Sept. 18, 1945 |
| 2,702,804 | Jacob | Feb. 22, 1955 |

OTHER REFERENCES

Chemical Abstracts, 16, 3101 (Copy in Scientific Library) (Abstract of British Medical Journal, 1922, 514–5).

Chemical Abstracts, 19, 530 (Copy in Scientific Library) (Abstract of Proc. Roy. Soc., London, 1924, 317–333, 96B).

Mees: The Theory of the Photographic Process, Revised Edition, pp. 386–387, Macmillan Co., N.Y., 1954. (Copy in Scientific Library.)

Clerc: "Photography Theory and Practice," 3rd ed., page 151, Pitman Pub. Corp., N.Y., 1942. (Copy in Div. 60.)